(12) United States Patent
Dennis et al.

(10) Patent No.: US 10,331,157 B2
(45) Date of Patent: Jun. 25, 2019

(54) METHOD AND APPARATUS FOR MANAGING POWER FLOW BETWEEN AN ALTERNATE ENERGY SOURCE AND A STORAGE DEVICE

(71) Applicant: EnSync, Inc., Menomonee Falls, WI (US)

(72) Inventors: Kevin Dennis, Waukesha, WI (US); Thomas A. Laubenstein, Waukesha, WI (US)

(73) Assignee: EnSync, Inc., Menomonee Falls, WI (US)

( * ) Notice: Subject to any disclaimer, the term of this patent is extended or adjusted under 35 U.S.C. 154(b) by 14 days.

(21) Appl. No.: 15/394,978

(22) Filed: Dec. 30, 2016

(65) Prior Publication Data

US 2017/0192445 A1     Jul. 6, 2017

Related U.S. Application Data

(60) Provisional application No. 62/273,592, filed on Dec. 31, 2015.

(51) Int. Cl.
| | |
|---|---|
| *G05F 1/66* | (2006.01) |
| *H02J 3/38* | (2006.01) |
| *H02J 3/32* | (2006.01) |

(52) U.S. Cl.
CPC .............. *G05F 1/66* (2013.01); *H02J 3/32* (2013.01); *H02J 3/383* (2013.01); *H02J 3/386* (2013.01); *H02J 3/387* (2013.01); *Y02E 10/563* (2013.01); *Y02E 10/566* (2013.01); *Y02E 70/30* (2013.01)

(58) Field of Classification Search
None
See application file for complete search history.

(56) References Cited

U.S. PATENT DOCUMENTS

| | | | |
|---|---|---|---|
| 7,929,327 B2* | 4/2011 | Haines | H02J 9/062 363/106 |
| 9,093,862 B2* | 7/2015 | Dennis | H02J 1/10 |

(Continued)

OTHER PUBLICATIONS

International Search Report and the Written Opinion of the International Searching Authority dated Mar. 22, 2017; International Patent Application No. PCT/US2016/069378; International Filing Date Dec. 30, 2016—(10) pages.

*Primary Examiner* — Ramesh B Patel
(74) *Attorney, Agent, or Firm* — Patterson + Sheridan, LLP

(57) ABSTRACT

A system that efficiently captures and utilizes the maximum generation capacity of an alternate energy source is disclosed. A first power converter is provided between the alternate energy source and a load. The first power converter is selected such that the capacity of the power converter is less than the generation capacity of the alternate energy source. A second power converter is selected such that the capacity of the second converter is at least equal to the difference between the capacity of the alternate energy source and the first power converter. A battery is provided to store the additional energy generated by the alternate energy source, and the second power converter is connected between the output of the alternate energy source and the battery. The power output from the first power converter is utilized to control operation of the second power converter.

20 Claims, 7 Drawing Sheets

(56) References Cited

U.S. PATENT DOCUMENTS

| | | | |
|---|---|---|---|
| 2011/0133552 A1* | 6/2011 | Binder | H02J 3/383 |
| | | | 307/22 |
| 2011/0137481 A1* | 6/2011 | Manz | H02J 7/35 |
| | | | 700/291 |
| 2011/0273022 A1* | 11/2011 | Dennis | H02J 1/10 |
| | | | 307/72 |
| 2013/0062953 A1* | 3/2013 | Nurmi | H02J 3/32 |
| | | | 307/72 |
| 2016/0241042 A1* | 8/2016 | Mammoli | H02S 40/38 |
| 2016/0315498 A1* | 10/2016 | Narla | H02J 4/00 |
| 2017/0070049 A1* | 3/2017 | Laubenstein | H02J 7/0003 |

\* cited by examiner

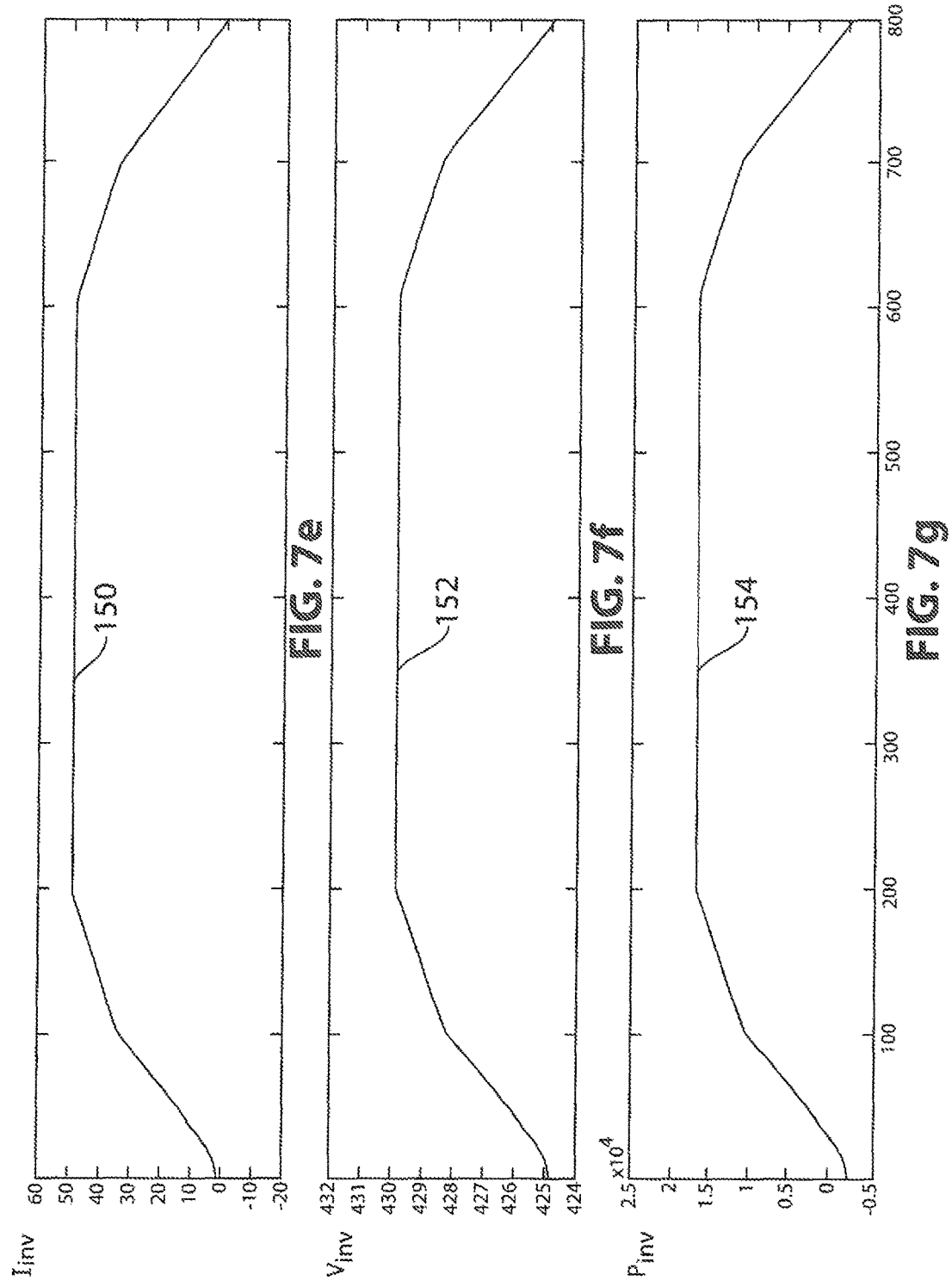

METHOD AND APPARATUS FOR MANAGING POWER FLOW BETWEEN AN ALTERNATE ENERGY SOURCE AND A STORAGE DEVICE

CROSS-REFERENCE TO RELATED APPLICATIONS

This application claims priority to U.S. provisional application Ser. No. 62/273,592, filed Dec. 31, 2015 and titled Method and Apparatus for Managing Power Flow Between an Alternate Energy Source and a Storage Device, the entire contents of which is incorporated herein by reference.

BACKGROUND OF THE INVENTION

The subject matter disclosed herein relates to a system for managing power flow between an alternate energy source and a storage device. More specifically, a first power converter is connected between the output of the alternate energy source and a load and a second power converter is connected between the output of the alternate energy source and the storage device, and operation of the power converters is controlled to provide consistent and predictable power to the load.

As is known to those skilled in the art, alternate energy sources often have a variable power generation capacity and generate a voltage having a variable amplitude and/or frequency. For example, a photovoltaic (PV) array generates a DC voltage and current having amplitudes that are a function of the light incident on the PV panel. As the angle of the sun varies in the sky or as clouds pass between the sun and a PV panel, the amount and intensity of light incident on the PV panel changes, thereby varying the energy generated by the PV panel. Similarly, a wind turbine rotates as a function of the wind speed passing over the blades of the wind turbine. The alternator driven by the rotating blades, therefore, generates a voltage having a variable frequency and/or amplitude as a function of the wind speed.

It is desirable to convert the variable voltage generated by the alternate energy sources to a voltage having an amplitude and/or frequency that remains generally constant or within an acceptable range of variation in order to provide the voltage to a load or back to the utility power grid. Historically, it has been known to provide a first power converter between the output of the alternate energy source and the load or the utility grid in order to convert the variable power generated by the alternate energy source to a constant power that may be provided to a load or to the utility power grid.

Due to the variable nature of energy generation, there may be periods of time when the alternate energy source generates more energy than required by loads connected to the system. It is desirable to provide energy storage to capture the energy generated during these periods. The energy stored during periods of excess generating capacity may subsequently be provided to the loads during periods in which the generating capacity is less than the energy required by the loads. Historically, a second power converter has been provided to regulate energy transfer to and from the energy storage device. During periods of excess energy generation when power is being transferred to the energy storage device, the energy storage device and power converter operate as a load to the alternate energy source. Similar to other loads, it is desirable to connect the power converter to an energy source delivering a constant voltage. The second power converter is, therefore, typically connected at the output of the first power converter.

As is understood in the art, the first power converter, may utilize a maximum power point tracking (MPPT) routine to control the power transfer from the alternate energy source to the load. The MPPT routine controls the rate at which energy is transferred from the alternate energy source to the load, and, as the name implies, keeps the first power converter operating at a point where the first power converter transfers power at a maximum efficiency as a function of the amount of power being generated.

Operation of the first power converter under a MPPT routine, however, does not necessarily result in the maximum power available being transferred from the alternate energy source. Because the size and cost of power conversion devices increases as the power ratings of the devices increase and because an alternate energy generating source may not regularly generate at its peak capacity, it may not be cost effective to provide a power converter capable of transferring all of the energy generated when the alternate energy source is operating at its peak generation capacity. Providing a power converter capable of transferring the peak energy that may be output by the alternate energy source will result in the power converter regularly operating at less than its rated capacity. This excess capacity of the power converter results in a more expensive power converter, which also requires more space for installation. Thus, it may be more economical to provide a power converter between the output of the alternate energy source and the load that is rated at less than the peak capacity of the alternate energy source. The cost and size required for installation of the power converter may be reduced while allowing the power converter to more regularly operate at its rated capacity.

However, because the power converter is rated at less than the maximum generation capacity of the alternate energy source, periods of time exist during which some of the capacity of the alternate energy source is lost. Thus, it would be desirable to provide a system that efficiently captures and utilizes the maximum generation capacity of the alternate energy source.

BRIEF DESCRIPTION OF THE INVENTION

The subject matter disclosed herein describes a system that efficiently captures and utilizes the maximum generation capacity of the alternate energy source. A first power converter is provided between the alternate energy source and a load. The first power converter may be selected such that the capacity of the power converter is less than the generation capacity of the alternate energy source. A second power converter is selected such that the capacity of the second converter is at least equal to the difference between the capacity of the alternate energy source and the first power converter. A battery is provided to store the additional energy generated by the alternate energy source, and the second power converter is connected between the output of the alternate energy source and the battery. The level of power output from the first power converter is utilized to control operation of the second power converter.

According to one embodiment of the invention, an energy storage system for connection to an alternate energy source is disclosed. The alternate energy source includes a first power converter operatively connected to provide energy from the alternate energy source to a utility grid. The energy storage system includes an energy storage device, a second power converter, at least one sensor, and a controller. The second power converter has an input and an output, where the input of the second power converter is operatively connected between an output of the alternate energy source and an input to the first power converter and the output of the second power converter is operatively connected to the energy storage device. The second power converter is operative to manage bidirectional power transfer between the input and the output of the second power converter. The at least one sensor is operatively connected to an output of the first power converter and generates a signal corresponding to a level of power output from the first power converter, and the controller receives the signal from the at least one sensor. The controller is operative to generate a command signal to the second power converter, where the command signal defines a desired magnitude and direction of power flow through the second power converter. The command signal is generated as a function of the signal corresponding to the level of power output from the first power converter.

According to another aspect of the invention, the controller may include a memory operative to store at least one setpoint. A first setpoint corresponds to a maximum power output from the first power converter, and the controller generates the command signal to transfer power from the input to the output of the second power converter when the level of power output from the first power converter is at the first setpoint. The controller may also generate the command signal to transfer power from the output to the input of the second power converter when the level of power output from the first power converter is less than a second setpoint, where the second setpoint is less than the first setpoint.

According to still another aspect of the invention, the controller may include a memory operative to store a schedule, and the schedule has a plurality of predefined time windows. Within the plurality of predefined time windows, there may be a first and a second time window. During the first time window, the controller generates the command signal to transfer power from the input to the output of the second power converter according to a maximum power point tracking routine and independent of the level of power output from the first power converter. During the second time window the controller generates the command signal to transfer power from the output to the input of the second power converter according to a desired level of power output from the first power converter.

According to yet another aspect of the invention, the controller may include an input operative to receive a power command signal, and the controller generates the command signal to transfer power from the output to the input of the second power converter when the power command signal is active. The energy storage system may also include a second controller. The second controller receives a signal corresponding to a level of power drawn from the utility grid and generates the power command signal when the level of power drawn from the utility grid exceeds a predefined level of power.

According to another embodiment of the invention, a system to manage utilization of energy generated by an alternate energy source is disclosed. The alternate energy source includes a first power converter operatively connected to provide energy from the alternate energy source to an AC load. The system includes a second power converter, at least one sensor, and a controller. The second power converter has an input and an output, where the input of the second power converter is operatively connected between an output of the alternate energy source and an input to the first power converter and the output of the second power converter is operatively connected to a power bus. The power bus is operatively connected to a secondary electrical system having at least one additional power source and at least one energy storage device. The second power converter is operative to manage bidirectional power transfer between the input and the output of the second power converter. The sensor is operatively connected to an output of the first power converter and generates a signal corresponding to a level of power output from the first power converter. The controller receives the signal from the at least one sensor and is operative to generate a command signal to the second power converter, where the command signal defines a desired magnitude and direction of power flow through the second power converter. The command signal is generated as a function of the signal corresponding to the level of power output from the first power converter.

According to other aspects of the invention, the AC load may be a utility grid and the first power converter may be operative to execute a maximum power point tracking routine to transfer power from the alternate energy source to the utility grid. The energy storage system may also include at least one sensor operatively connected to an output of the alternate energy source generating a signal corresponding to a level of power output from the alternate energy source. The controller may compare the signal corresponding to the level of power output from the first power converter to the signal corresponding to the level of power output from the alternate energy source. The controller may generate the command signal to transfer power from the input to the output of the second power converter when the level of power output from the alternate energy source is greater than the level of power output from the first power converter, and the controller may generate the command signal to transfer power from the output to the input of the second power converter when the level of power output from the alternate energy source is less than the level of power output from the first power converter.

According to still another embodiment of the invention, a method for managing utilization of energy generated by an alternate energy source is disclosed. The alternate energy source includes a first power converter operatively connected to provide energy from the alternate energy source to an AC load. A level of power output from the first power converter is measured with at least one sensor operatively connected to the output of the first power converter. The level of power output from the first power converter is compared to a first threshold with a controller. The first threshold corresponds to a maximum level of power to transfer with the first power converter, and the first threshold is less than the maximum power generation capacity of the alternate energy source. A command signal is generated in the controller to transfer power from an input of a second power converter to an output of the second power converter when the level of power output from the first power converter is at the first threshold. The input of the second power converter is operatively connected between an output of the alternate energy source and an input to the first power converter, and the output of the second power converter is operatively connected to at least one energy storage device. The second power converter is operative to manage bidirectional power transfer between the input and the output of the second power converter. The command signal is transmitted from the controller to the second power converter to transfer power generated by the alternate energy source beyond the first threshold to the energy storage device.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which.

Figure 1:
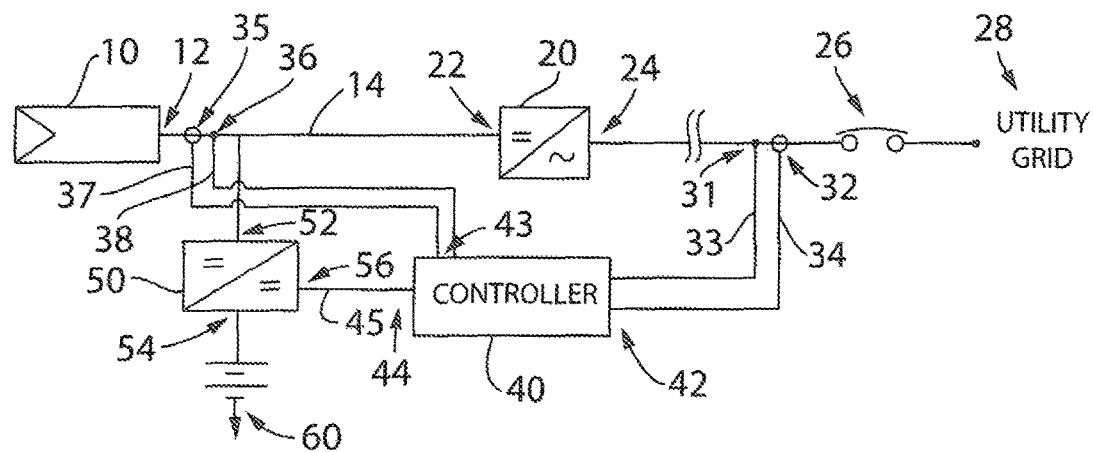
FIG. 1 is a block diagram representation of a system for managing power flow between a photovoltaic array and a storage device according to one embodiment of the invention.
Figure 6A:
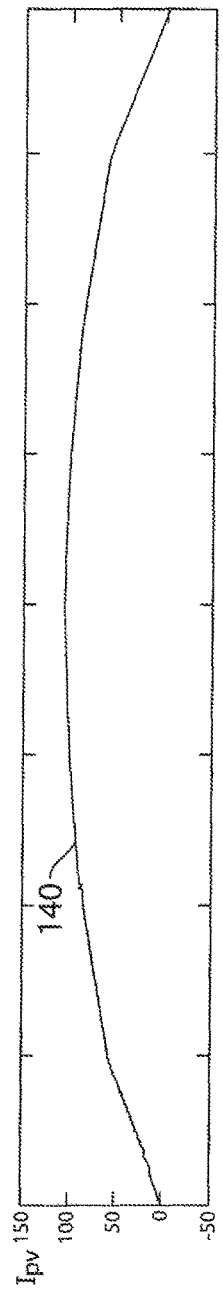
FIG. 6 is a graphical representation of exemplary currents and voltages in the system of FIG. 1 when the storage device and associated power converter are disabled or not present, where.
Figure 6B:
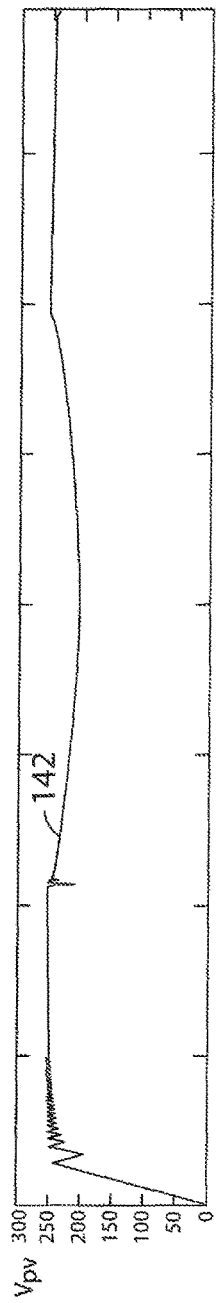
Figure 6C:
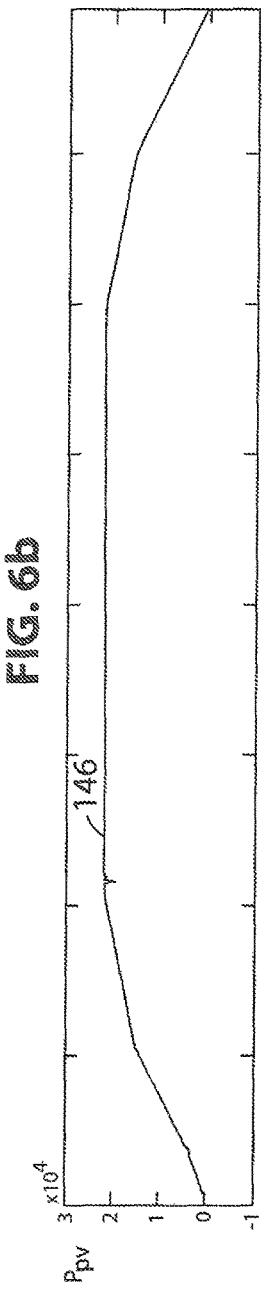
Figure 6D:
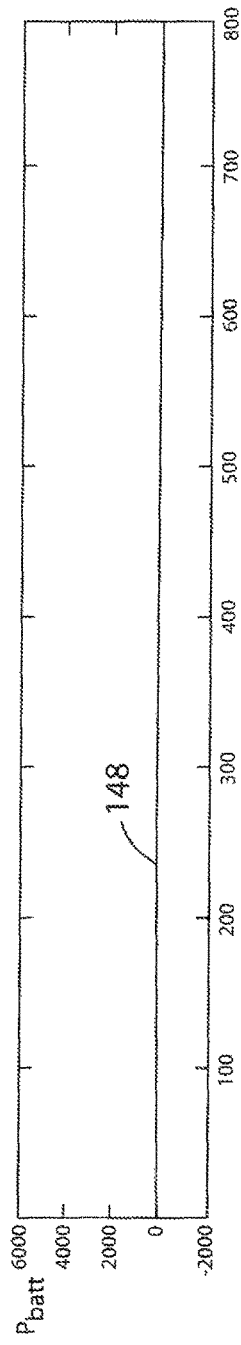
Figures 6E, 6F, 6G:
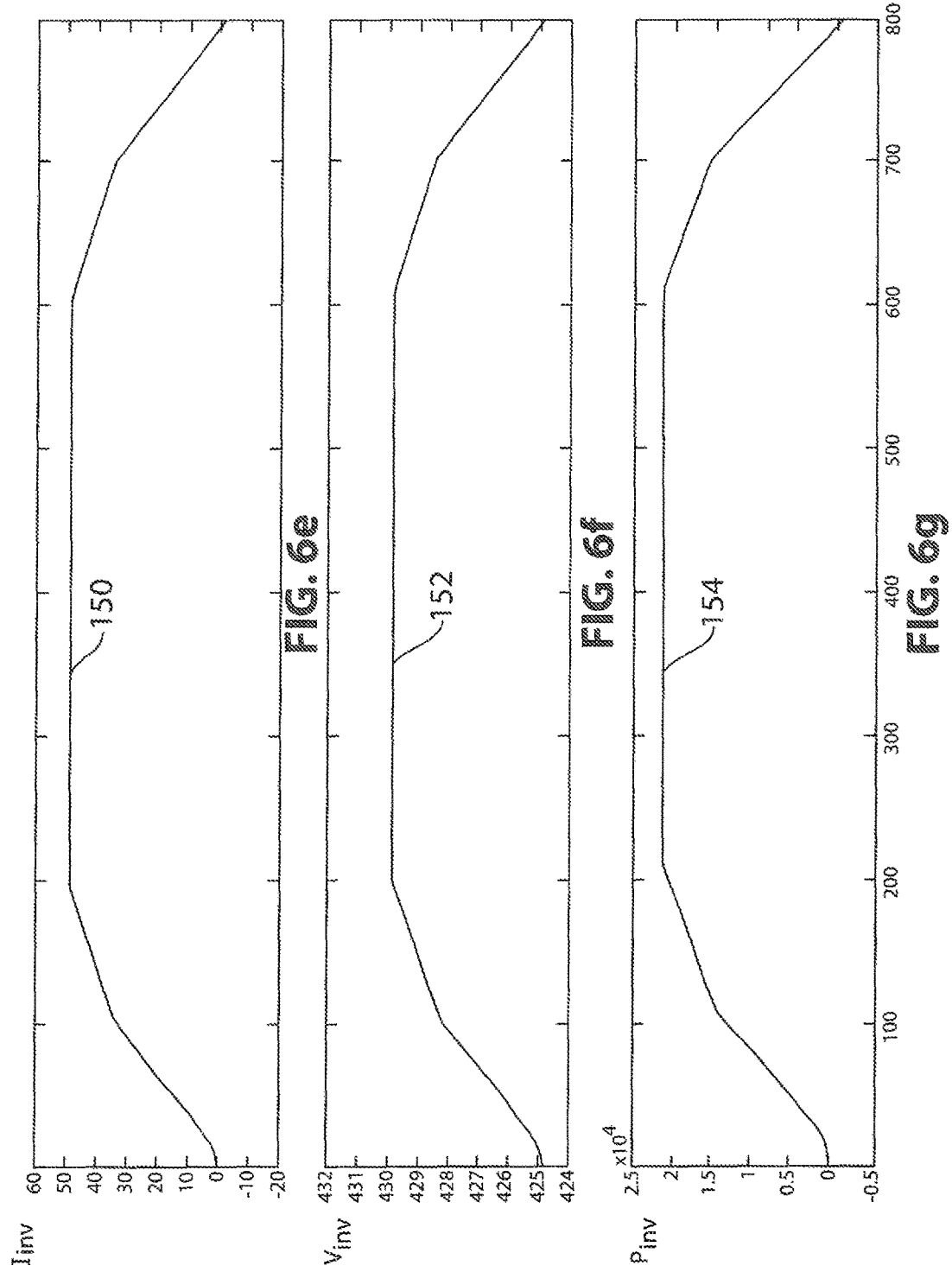
Figure 7A:
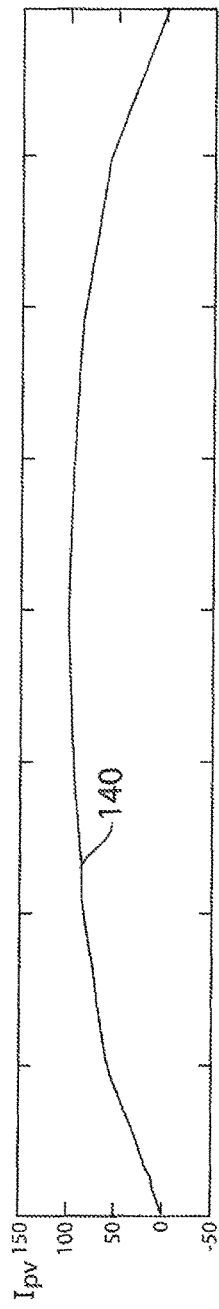
Figure 7B:
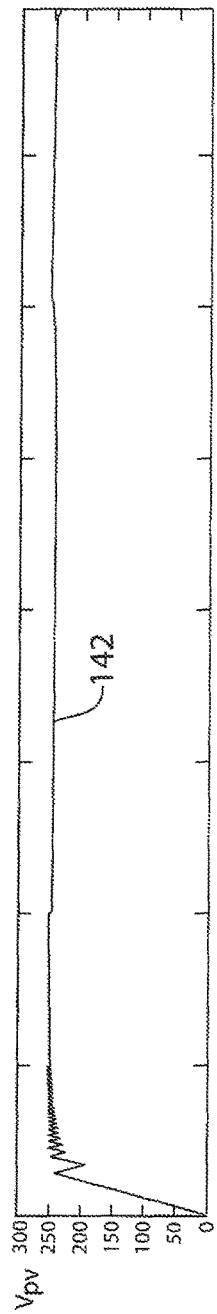
Figure 7C:
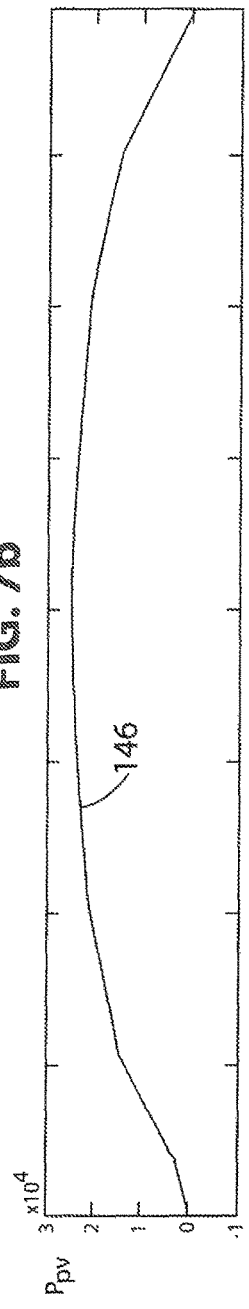
Figure 7D:
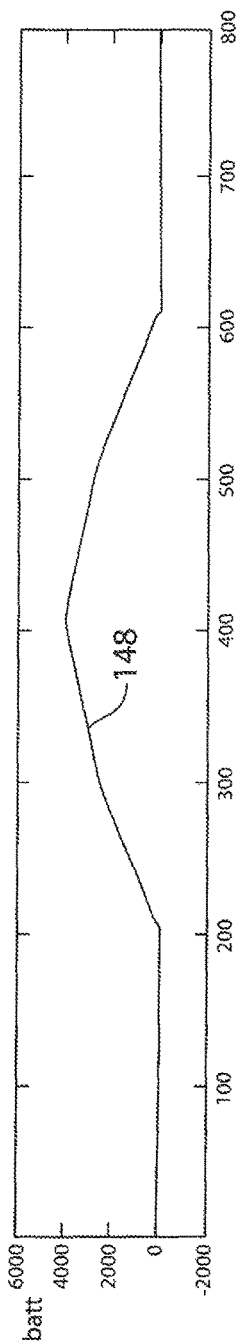

FIG. 6a is a graphical representation of the current output from the photovoltaic array over a period of time, FIG. 6b is a graphical representation of the voltage output from the photovoltaic array over the period of time, FIG. 6c is a graphical representation of the power output from the photovoltaic array over the period of time, FIG. 6d is a graphical representation of the power stored in the battery over the period of time, FIG. 6e is a graphical representation of the current output from the power converter between the output of the photovoltaic array and the utility grid over the period of time, FIG. 6f is a graphical representation of the voltage output from the power converter between the output of the photovoltaic array and the utility grid over the period of time, and FIG. 6g is a graphical representation of the power output from the power converter between the output of the photovoltaic array and the utility grid over the period of time; and FIG. 7 is a graphical representation of exemplary currents and voltages in the system of FIG. 1 when the storage device and associated power converter are enabled or present, where:

FIG. 7a is a graphical representation of the current output from the photovoltaic array over a period of time, FIG. 7b is a graphical representation of the voltage output from the photovoltaic array over the period of time, FIG. 7c is a graphical representation of the power output from the photovoltaic array over the period of time, FIG. 7d is a graphical representation of the power stored in the battery over the period of time, FIG. 7e is a graphical representation of the current output from the power converter between the output of the photovoltaic array and the utility grid over the period of time, FIG. 7f is a graphical representation of the voltage output from the power converter between the output of the photovoltaic array and the utility grid over the period of time, and FIG. 7g is a graphical representation of the power output from the power converter between the output of the photovoltaic array and the utility grid over the period of time.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

As discussed herein, a system for managing power flow between an alternate energy source and a storage device is disclosed. The alternate energy sources typically generate a variable level of power where the level is often dependent on environmental conditions. For example, a photovoltaic (PV) array generates power as a function of the intensity of light incident on PV panels within the array, also known as insolation. The intensity of light varies throughout the day as a function of the angle of the sum in the sky with respect to the PV panel on the ground. Atmospheric conditions such as clouds, fog, haze, precipitation, and the like may reduce the amount of light incident on a PV panel. The interruption may be of a short duration or last throughout a day. A wind turbine generates power as a function of the speed of wind passing over the turbine blades. Although additional control may be provided in the turbine, for example, to control the pitch of the blades, the amount of power generated will vary due to variations in both the level of sustained winds as well as the level of wind gusts. For convenience, the invention will be discussed with respect to a PV array. However, the exemplary environment is not intended to be limiting and the system may be applied to other renewable energy sources including, but not limited to, wind turbines, fuel cells, wave generation, and the like.

Turning initially to FIG. 1, one embodiment of a system for managing power flow between an alternate energy source and a storage device is illustrated in use with a PV array 10. As is understood in the art, the PV array 10 generates power in response to the intensity of light incident on each PV panel. The power is provided at an output 12 of the PV array 10 and is typically in the form of a direct current (DC) power. A DC bus 14 is connected to the output 12 of the PV array 10 for subsequent connection by other devices and is configured to conduct a DC voltage and current. A first power converter 20 is provided to convert the DC power to AC power. The DC bus 14 is connected to an input 22 on the first power converter 20, and AC power is provided from an output 24 of the first power converter 20. According to the illustrated embodiment, the PV array 10 is being connected to a utility grid 28 via a circuit breaker 26. Optionally, the PV array 10 may be used in an off-grid installation and the output 24 of the first power converter 20 may be provided directly to an electrical load.

A second power converter 50 is used to manage energy flow between the DC bus 14 and a storage device. According to the illustrated embodiment, the storage device is a battery 60. It is contemplated that the battery 60 may be a single battery or multiple batteries connected in a series connection, a parallel connection, or a combination thereof. It is further contemplated that the battery 60 may include one or more battery cells of the same construction, such as flow batteries or lithium-ion batteries, or optionally, the battery 60 may include one or more battery cells of different construction, such as flow batteries and lithium-ion batteries. The second power converter 50 is connected between the DC bus 14 and the battery 60. An input 52 on the second power converter 50 receives power from the output 12 of the PV array 10 via the DC bus 14, and an output 54 of the second power converter 50 provides the power to the battery 60. The second power converter 50 is bidirectional and is operable in a first mode to convert the varying power supplied from the PV array 10 to a desired voltage level and current used to charge the battery 60. The second power converter 50 may operate in a second mode to discharge the battery 60, transferring energy from the battery 60 to the DC bus 14. It is further contemplated that multiple power converters 50 may be connected in parallel between the DC bus 14 and different batteries 60. Although the illustrated embodiment shows a DC-to-DC converter, other embodiments of the invention may utilize an AC-to-DC converter, for example, when the alternate energy source is a wind turbine generating AC power rather than a PV array generating DC power.

Figure 2:
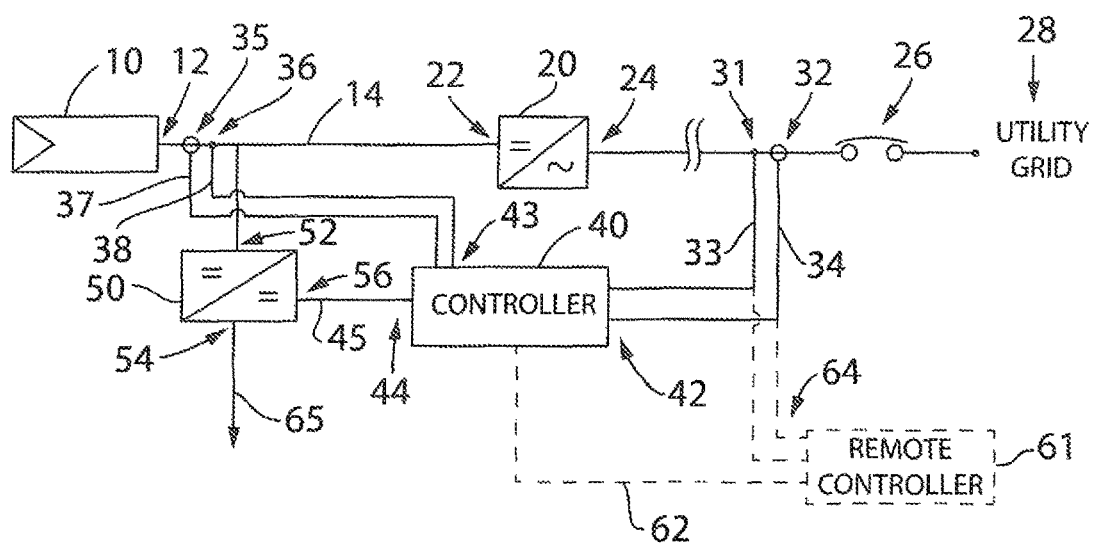
FIG. 2 is a block diagram representation of a system for managing power flow between a photovoltaic array and a storage device according to another embodiment of the invention.

Turning next to FIG. 2, another embodiment of a system for managing power flow between an alternate energy source and a storage device is illustrated in use with a PV array 10. As discussed above with respect to FIG. 1, the PV array 10 outputs direct current (DC) power on the DC bus 14 for subsequent connection by other devices and is configured to conduct a DC voltage and current. A first power converter 20 is provided to convert the DC power to AC power. According to the illustrated embodiment, the PV array 10 is being connected to a utility grid 28 via a circuit breaker 26. Optionally, the PV array 10 may be used in an off-grid installation and the output 24 of the first power converter 20 may be provided directly to a load.

As illustrated in FIG. 2, the second power converter 50 is used to manage energy flow between the DC bus 14 from the PV array 10 and a second power bus 65. In this embodiment, it is contemplated that the second power bus may be part of a second electrical system, where the second electrical system is able to store and return energy. It is contemplated that the second electrical system may include still other energy generation sources and may include an energy storage device connected, for example, via a third power converter between the second power bus 65 and the energy storage device. Another system controller (not shown) may be provided in the second electrical system and may be in communication with the controller 40 for the second power converter 50 to provide information regarding the second electrical system. The second power converter 50 is bidirectional and is operable in a first mode to convert the varying power supplied from the PV array 10 to a desired voltage level to supply power to the second power bus 65. The second power converter 50 may also operate in a second mode to transfer power from the second power bus 65 to the DC bus 14 connected between the PV array 10 and the first power converter 20. It is contemplated that the second power bus 65 may be either a DC bus or an AC bus according to the requirements of the second electrical system to which it is connected. The second power converter 50 may similarly be selected to convert from either AC or DC to either AC or DC power according to the type of the alternate energy source and the type of power bus in the system.

It is further contemplated that a second controller 61 may be included in the system. The second controller 61 may be a central controller providing commands to multiple controllers 40 each executing with separate PV arrays 10 or other alternate energy sources. Optionally, the second controller 61 may be a customer controller, providing, for example, supervisory capabilities, power monitoring, data logging, or a combination, thereof. A communication connection 62 is provided between the second controller 61 and the first controller 40. The second controller 61 may be located at a location remote from the first controller 40. Optionally, the first and second controllers may be located proximate each other. It is further contemplated that the second controller 61 may receive feedback signals corresponding to operation of the system. According to the illustrated embodiment, an input 64 of the second controller 61 receives the voltage and current feedback signals 33, 34 from the voltage and current sensors 31, 32 at the output of the first power converter 20. Optionally, the second controller 61 may similarly receive the current and voltage feedback signals 37, 38 from the current and voltage sensors 35, 36 at the output of the PV array 10. According to still another option, the second controller 61 may receive feedback signals via a data message transmitted along the communication connection 62 from the first controller 40. The second controller 61 may include transitory or non-transitory memory to store data and/or instructions for execution on the second controller 61. Further, the second controller 61 may include one or more processors executing in parallel or individually to execute the stored instructions.

The controller 40 is provided to monitor operation of the system and to command operation of the second power converter 50. According to the illustrated embodiment, the controller 40 is a separate device. Optionally, the controller 40 may be incorporated into either the first power converter 20 or the second power converter 50. A first voltage sensor 31 and a first current sensor 32 may be operatively connected to a conductor from the output of the first power converter 20 to generate a voltage signal 33 and a current signal 34, respectively. Optionally, the first power converter 20 may provide an output signal corresponding to the voltage, current, or both to the controller 40. According to yet another embodiment, a watt transducer may be connected to the output 24 and generate a signal directly corresponding to the amplitude of power present at the output 24. The voltage and current signals 33, 34 are provided to an input 42 of the controller 40. The controller 40 determines the power output from the first power converter 20 as a function of the voltage and current signals 33, 34. If a watt transducer is provided, the power signal may be utilized directly from the watt transducer.

The controller 40 may similarly monitor operation of the DC bus 14. A second voltage sensor 35 and a second current sensor 36 may be operatively connected to the DC bus 14 to generate a voltage signal 37 and a current signal 38, respectively. Optionally, either the first or second power converter 20, 50 may provide an output signal corresponding to the voltage and/or current on the DC bus 14 to the controller 40. According to yet another embodiment, a watt transducer may be connected to the DC bus 14 and generate a signal directly corresponding to the amplitude of power present on the DC bus 14. The voltage and current signals 37, 38 are provided to an input 43 of the controller 40. The controller 40 determines the power output on the DC bus 14 as a function of the voltage and current signals 37, 38. If a watt transducer is provided, the power signal may be utilized directly from the watt transducer.

The controller 40 generates signals 45 to control operation of the second power converter 50 as a function of the power output from the first power converter 20 and of the power present on the DC bus 14. The controller 40 may include transitory or non-transitory memory to store data and/or instructions for execution on the controller 40. Further, the controller 40 may include one or more processors executing in parallel or individually to execute the stored instructions. The control signal 45 is provided from an output 44 of the controller 40 to an input 56 of the second power converter 50. It is contemplated that the control signal 45 may correspond to the level of power output from the first power converter 20 as determined by the controller 40. Optionally, the level of power as determined by the controller 40 may be further processed into a reference signal, such as a current reference, indicating a desired level of current to be transferred between the DC Bus 14 and the battery 60.

Figure 4:
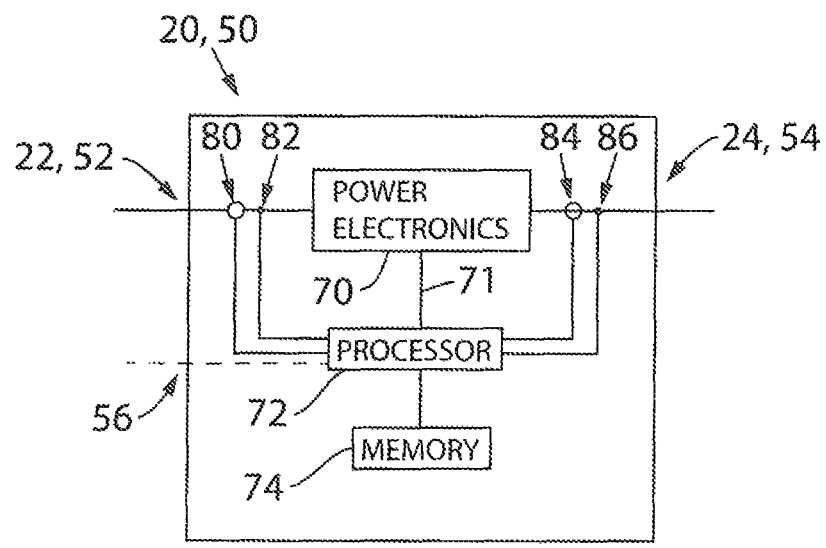
FIG. 4 is a block diagram representation of a power converter of FIG. 1.

Referring next to FIG. 4, an exemplary power converter is illustrated. The exemplary power converter may be representative of either the first power converter 20 or the second power converter 50 of FIG. 1. For convenience, the exemplary power converter will be discussed with respect to both the first and second power converters 20, 50. Each of the power converters 20, 50 has a power conversion section including power electronic devices 70 and a control section. The control section includes a processor 72 capable of executing a program to send control signals 71 to the power electronic devices 70 and memory 74 for storing the program capable of executing on the processor 72. The memory 74 may be transitory, non-transitory, or a combination thereof. The power converter 20, 50 may include a current sensor 80 and/or a voltage sensor 82 at the input 22, 52 of the power converter 20, 50 and a current sensor 84 and/or a voltage sensor 86 at the output 24, 54 of the power converter 20, 50. The voltage and current sensors present are a function of the power converter 20, 50 and the routines executing on the processor 72 to control conversion of power from the input to the output. The voltage and/or current signals generated by the respective sensors are read by the processor 72 to regulate power flow through the power converter 20, 50. The second power converter 50 may also include an input 56 to receive the control signal 45 from the controller 40.

In operation, the first and second power converters 20, 50 work together to harvest all of the energy generated by the alternative generating source. The power rating of the first power converter 20 is typically selected less than the rating of the alternative generating source. The power rating of the first power converter 20 may be selected to transfer between about 60 to 95 percent of the maximum power capacity of the alternative generating source and more preferably, the power rating of the first power converter 20 is selected to transfer between about 80 to 90 percent of the maximum power capacity of the alternative generating source. The power rating of the second power converter 50 is selected to transfer at least the difference between the maximum power capacity of the alternative generating source and the power rating of the first power converter 20. For example, the power rating of the second power converter 50 may be selected to transfer the difference between the maximum power capacity of the alternative generating source and the power rating of the first power converter 20 plus an additional margin between 5 and 10 percent of the rating of the first power converter 20. Optionally, the power rating of the second power converter 50 may be selected to transfer the full rated power capacity of the alternative generating source.

The battery 60 is selected according to the application requirements. The application requirements include, for example, the type of alternate energy source (e.g., PV, wind, etc. . . . ), the difference in power rating between the first power converter 20 and the capacity of the alternate energy source, and the expected percentage of operating time that the alternate energy source generates power beyond the capacity of the first power converter 20. According to one embodiment, a battery is selected with sufficient storage capacity to accept the energy generated by the alternate energy source in excess of the capacity expected to be transferred by the first power converter to the utility grid or to a load. The energy stored in the battery 60 is then delivered to the utility grid 28 during periods of low generation as will be discussed in more detail below.

In addition to being selected for new installations, it is contemplated that the system may be retrofit to existing installations. Many existing installations include an alternative energy source and the first power converter. As discussed above, the first power converter 20 was sized to handle less than the rated capacity of the alternative energy source to which it is connected. The second power converter 50 and battery 60 may be selected as indicated above. The second power converter 50 is connected at an output of the alternate energy source, such as the DC bus 14 illustrated in FIG. 1, and before the first power converter 20. The controller 40 and sensors are also added to generate a control signal for the second power converter. As a result, the second power converter 50, battery 60, and controller 40 may be retrofit to existing installations without requiring reconfiguration of the existing installation.

Figure 3:
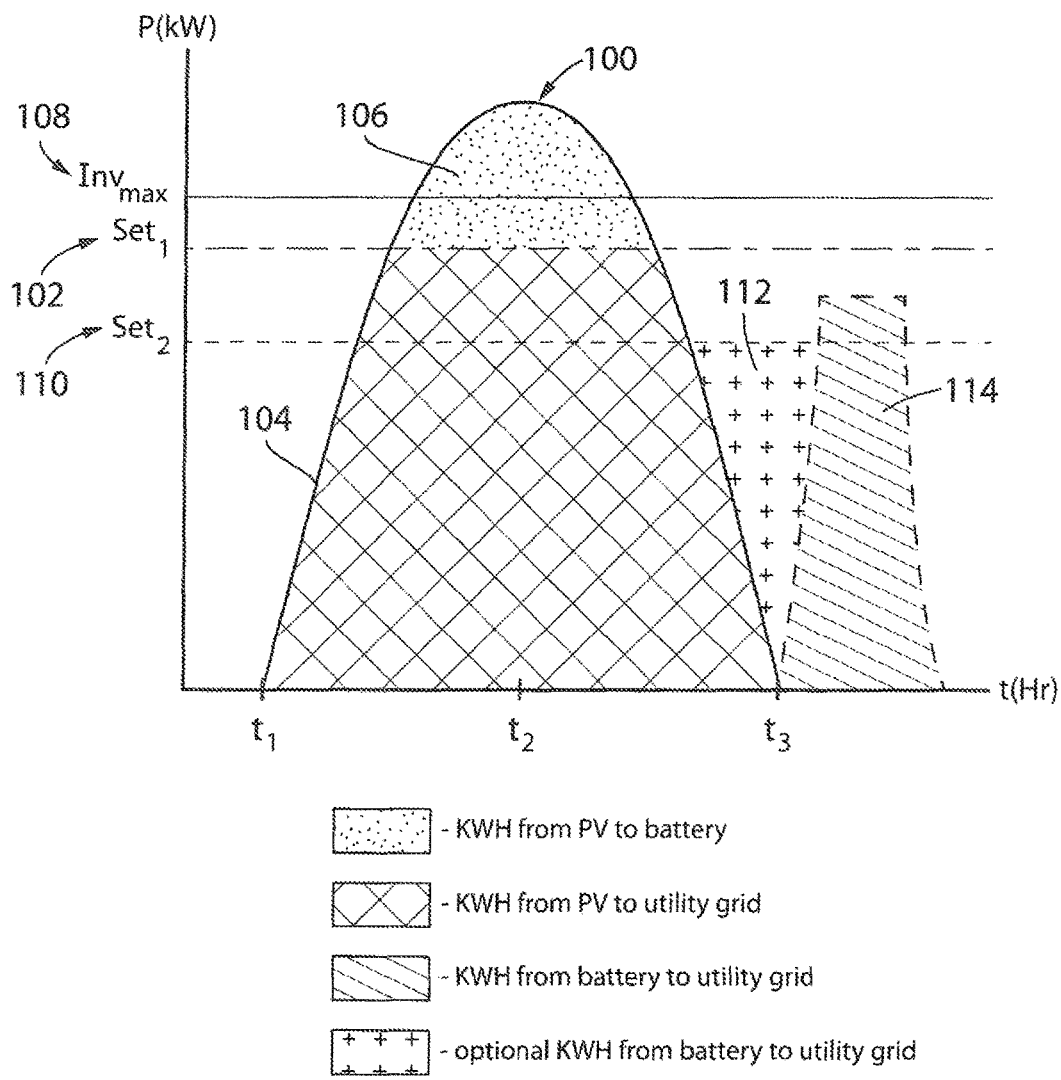
FIG. 3 is a graphical representation of a variable power level generated by the photovoltaic array of FIG. 1 and of power flow between the battery and an output of the photovoltaic array.
Figure 5:
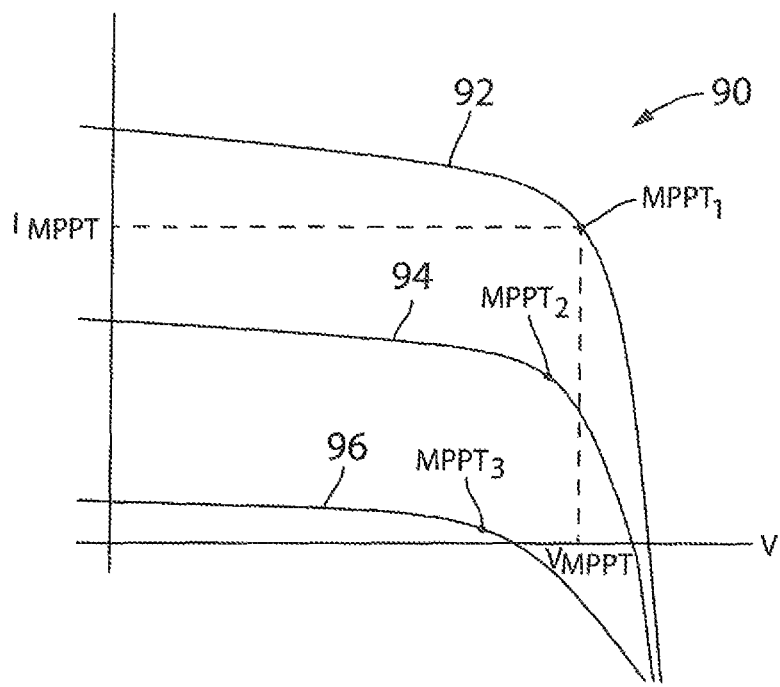
FIG. 5 is a graphical representation of power generated by a photovoltaic array at varying levels of insolation.

With reference next to FIG. 3, the power generated by an exemplary PV array 10 is illustrated. The curve 100 demonstrates an exemplary power curve over the course of a day. At a first time, $t_1$, the sun rise starts and the PV array 10 begins to generate power. At a second time, $t_2$, typically noon, the sun is at its peak point in the sky and the PV array 10 is generating its maximum capacity. At a third time, $t_3$, the sun set is complete and the PV array 10 no longer generates power. Referring also to FIG. 5, a graph 90 illustrates the voltage and current relationships for an exemplary PV array at varying levels of insolation. During periods when the PV array 10 is receiving maximum light, it is capable of generating its maximum power as represented by the top curve 92. At periods of medium and low light intensity, the power capability of the PV array 10 decreases as represented by curves 94 and 96, respectively. Each insolation curve demonstrates the current that will be output by the PV array 10 at a particular voltage. Because the current-voltage relationship is non-linear, the first power converter 20 may execute a maximum power point tracking (MPPT) module to identify the operating point at which the maximum power can be transferred from the PV array 10 to the DC bus 14 for a given level of insolation, identified as MPPT1-MPPT3. It is contemplated that the first power converter 20 may utilize any suitable MPPT routine including, but not limited to perturb-observe, incremental conductance, current sweep, or constant voltage. When the first power converter 20 reaches its rated capacity, however, it must limit the power transfer to its rated capacity. As the insolation continues to increase, the first power converter 20 may select an operating point along the higher insolation curve with a lower voltage level such that the total power (i.e., voltage times current) remains at the rating of the power converter 20.

Referring again to FIG. 3, the controller 40 may include one or more configurable setpoints to control operation of the second power converter 50. According to the illustrated embodiment, two setpoints 102, 110 are provided. A first, setpoint 102, $Set_1$, is configurable to identify a maximum power at which the first power converter 20 operates by itself. The first setpoint 102 must be no greater than the maximum power rating 108, $Inv_{max}$, for the first power converter 20. As shown in FIG. 3, the first setpoint 102 is set close to the maximum power rating 108. By setting the first setpoint 102 less than the maximum power rating 108 of the first power converter 20, the first power converter 20 is able to continue operating utilizing its MPPT routine rather than saturating at the maximum power rating 108. The first setpoint may be, for example, 5 to 10 percent less than the maximum power rating 108. Selecting a second power converter 50 with a rating of 5 to 10 percent greater than the difference between the maximum power rating of the source and the maximum power rating of the first power converter 20 allows the second power converter 50 to also transfer the additional power generated by the source between the first setpoint 102 and the maximum rating 108 of the first power converter.

The controller 40 receives the feedback signals 33, 34 from the voltage and current sensors 31, 32, as illustrated, or from a watt transducer to determine the power output from the first power converter 20. The controller 40 may determine the power output, from the first power converter 20 using the voltage and current feedback signals 33, 34 or, optionally, use a feedback signal corresponding directly to power if a watt transducer is provided. When the first power converter 20 is outputting power equal to or greater than the first setpoint 102, the controller 40 generates a command signal 45 to enable the second power converter 50.

With the second power converter 50 enabled, the second power converter 50 begins to draw power directly from the DC bus 14 at a rate that keeps the first power converter 50 at or nearly at the first setpoint 102. A control loop monitors the amount of power being output from the first power converter 50. As the power increases, the control loop commands the second power converter 50 to draw more power from the DC bus 14. As the power decreases, the control loop commands the second power converter 50 to draw less power from the DC bus 14. Thus, during the period of the day in which the power curve 100 is greater than the first setpoint 102, the second power converter 50 will remain enabled, absent other conditions, such as clouds. As may be appreciated, as the power generated by the PV array 10 decreases below the first setpoint 102, the amount of power the control loop commands the second power converter to draw will drop to zero and the second power converter 50 is disabled. The area identified by reference numeral 106 corresponds to kilowatt hours of energy that are transferred to the battery 60 via the second power converter 50. The area identified by the reference numeral 104 corresponds to kilowatt hours transferred directly to the utility grid 28 via the first power converter 20.

The controller 40 may further include a second setpoint 110, $Set_2$, which may be used to command the second power converter 50 to transfer energy from the battery 60 back to the DC bus 14. The second setpoint 110 may be selected at a level that would typically occur toward the end of the day and corresponds to a time when the power generated by the PV array 10 and, consequently, the power output from the first power converter 20 drops below the second setpoint 110. If there is energy stored in the battery 60, the controller again enables the second power converter 50 but this time regulates power flow from the battery 60 to the DC bus 14.

The control loop again monitors the amount of power being output from the first power converter 50. As the power decreases, the control loop commands the second power converter 50 to transfer more power to the DC bus 14. If the power increases, the control loop commands the second power converter 50 to transfer less power to the DC bus 14. As may be appreciated, the control loop may only command the second power converter 50 to transfer power at a rate up to the rated capacity of the second power converter 50. Optionally, the rate of transfer may also be limited due to the type and/or physical construction of the batteries. Further, the second power converter 50 will only continue to transfer power to the DC bus 14 until the energy in the battery 60 is discharged. As a result, the battery 60 stores the excess generation capacity of the PV array 10 during periods of maximum production and returns the energy to the DC bus and, ultimately, to the utility grid 28 via the first power converter 20 during periods of reduced energy production. The area identified by the reference numeral 112 corresponds to power transferred from the battery to the grid while the first power converter 20 is operating.

In a similar manner, the second power converter 50 and battery 60 may provide a smoothing function for power supplied from the first power converter 20 throughout the day. If the battery 60 has some charge and, for instance, a cloud passed between the sun and the PV array 10, the insolation may drop significantly. The power output from the first converter 20 may drop below the second threshold 110 and the second power converter 50 may begin providing energy to the DC bus 10. When the cloud passes by, the insolation may again increase such that the PV array 10 is generating power above the capacity of the first power converter 20. The controller 40 will command the second power converter 50 to switch operation and begin drawing power from the DC bus 10 such that the first power converter 20 continues operating in an MPPT mode throughout the transitions in operation for the second power converter 50.

It is further contemplated the second power converter 50 may be utilized in a "peak shaving" capacity to reduce temporary spikes in power demanded by loads connected to the system. Although not shown, it is contemplated that electrical loads may be connected between the output 24 of the first power converter 20 and the utility grid 28. A service panel may, for example, connected to the power conductors extending between the first power converter 20 and the utility grid 28 and provide busses to which circuit breakers may be connected for power distribution to individual loads in a residential or commercial facility. If the electrical load drawn from the service panel is less than the amount of power generated by the alternate energy source, the excess capacity is delivered to the utility grid 28. However, if the electrical load drawn from the service panel is greater than the amount of power generated by the alternate energy source, the excess power required by the electrical load is drawn from the utility grid 28. As discussed above, the alternate energy source may generate a variable level of power. During periods of low power generation, therefore, there may a high demand in power by electrical loads connected to the system. During periods of high demand, the second power converter 50 may be commanded to supply power from the energy storage device 60 to the DC bus 14 to reduce the peak power demand from the utility grid 28.

With reference also to FIG. 2, a remote, or second, controller 61 may be provided to the energy storage system to generate power commands for the first controller 40. The second controller 61 may monitor power drawn by loads as well as power supplied from the first power converter 20. The second controller 61 may store a threshold for a peak power drawn by the loads from the utility grid 28. If the level of power drawn by the loads minus the power supplied from the first power controller 40 reaches or exceeds the threshold, the second controller 61 generates a power command signal, requesting the first controller 40 to supply power from the energy storage device 60 or from the power bus 65 to reduce the peak demand. The power command signal is transmitted via the communication connection 62 to the first controller 40. The first controller 40 commands the second power converter 50 to transfer energy from energy storage device 60 or from the power bus 65 to the bus 14 between the PV array 10 and the first power converter 20. The first power converter 20, in turn, supplies the additional power transferred by the second power converter 50 along with the power generated by the alternate energy source to the service panel for use by the electrical loads, thereby reducing the power drawn from the utility grid 28.

It is further contemplated that the second controller 61 may provide power commands to the first controller 40 to achieve a desired power regulation by the first power converter 20. As previously discussed, the energy storage system disclosed herein may be connected to an existing alternate energy source and existing power converter. It is often desirable and/or required that no modification be made to the existing system. By sending a desired power command to the second power converter 50, however, the energy storage system may effectively control operation of the existing power converter. For example, if it is desired to have no power output from the first power converter 20, the second power converter 50 may receive a command to draw all power from the DC bus 14 to the energy storage device 60 or the power bus 65. The first power converter 20 operates as if the PV array is not producing power or is producing very little power, such as at night, and transfers no power. As discussed above, the second power converter may similarly receive power commands to supplement, or smooth, dips in the power supplied by the PV array 10 or to reduce peak demands from electrical loads attached to the system. The second power converter 50 transfers power to and from the DC bus 14 to achieve the desired operation at the output of the first power converter 20 without requiring modification to the existing system. Optionally, it is contemplated that a portion or all of the power control may be implemented within the first controller 40.

If the controller 40 is configured to not include the second setpoint 110 or energy remains in the battery 60 after the third time, $t_3$, shown in FIG. 3, (i.e., past sunset), the battery 60 must still be discharged such that it is ready to accept energy during the next period of excessive generation. Thus, rather than or in addition to utilizing a second setpoint 110, the controller 40 may be configured to begin a discharge cycle when the PV array 10 is no longer generating power. The controller 40 enables the second power converter 50 to transfer energy to the DC bus 14. The first power converter 20 will respond, not being aware of whether the energy is generated by the PV array 10 or supplied from the battery 60, and begin transferring power to the utility grid 28. The controller commands the second power converter 50 to continue the power transfer until the battery 60 is discharged. The area identified by the reference numeral 114 corresponds to power transferred from the battery to the grid during such a discharge cycle.

The second power converter 50 may be configured to receive various commands to control power transfer between the battery 60 and the DC bus 14. The power commands may be, but are not limited to, a current limit, voltage bands on the DC bus, a power command, or a current command. As previously discussed, the commands may facilitate harvesting the full energy generation capacity of the alternate energy source, smooth supply of the power from the alternate energy source to an electrical load, or reduce peak power requirements from the utility grid. It is further contemplated, that the second power converter 50 may be used in yet another application, for example, to reduce energy charges for an energy consumer. For example, the cost of energy consumption may vary throughout a day based on factors including, but not limited to, projected energy supply capacity, projected energy demand, or weather conditions. During a period when energy costs are low, the second power converter 50 may be commanded to execute a MPPT routine as discussed above with respect to the first power converter 20 to draw power from the alternate energy source up to the rated capacity of the second power converter 50 to the energy storage device 60. During, periods when energy costs are high, the second power converter 50 may then be commanded to supply the energy stored in the energy storage device 60 back to the first power converter 20 to either supply loads connected to the system or to sell the power back to the utility grid 28. Thus, electrical loads connected to the energy storage system may be supplied from the utility grid 28 during periods of lower energy cost and supplied by the alternate energy source during periods of higher energy cost.

The controller 40 may also store a schedule having predefined time windows. During a first time window, the second power converter 50 may be controlled to draw power from the DC bus 14 and during a second time window, the second power converter 50 may be controlled to supply power to the DC bus 14.

Referring next to FIGS. 6 and 7, exemplary operation of the system is illustrated. In FIG. 6, the second power converter 50 is not present and/or disabled. The power 146 supplied from the PV array 10 is shown in FIG. 6c. The power is ramped up until it reaches a maximum level and then remains constant. As seen in FIGS. 6e-6g, the current 150, voltage 152, and, in turn, the power 154 similarly increase until the first power converter 20 reaches a maximum power rating. The power 146 drawn from the PV array 10 reaches its limit at the same time the first power converter 20 reaches its limit. As may be observed in FIGS. 6a and 6b, the first power converter 20 must deviate from its MPPT operation at the point at which it reaches its rated capacity. The insolation on the PV array 10 is continuing to increase, as may be evidenced by the continual increase in the current 140 from the PV array 10. However, because the first power converter 20 has reached its maximum power rating, it must move back on the insolation curves and operate at a reduced voltage as shown on the PV array voltage curve 142. Once the insolation decreases below the rated capacity of the first power converter 20, the current 150, voltage 152, and, in turn, power 154 curves begin ramping down and the first power converter 20 is again operating under its MPPT routine.

In FIG. 7, the second power converter is present and/or enabled. The same power generation is provided by the PV array 10 as was provided for the curves illustrated in FIG. 6. As shown in FIGS. 7e-7g, the first power converter 20 operated in the same manner as when no second power converter 50 was present. However, in FIG. 7c, it is observed that the power 146 from the PV array is greater than for the example illustrated in FIG. 6. The voltage 142 on the PV array remains at a constant, or nearly constant, level indicating the first power converter 20 is able to maintain operation under the MPPT routine. The current 140 on the PV array continues to increase as insolation increases. The difference is that power 148 is supplied to the battery as shown in FIG. 7d. The power provided to the battery 60 corresponds to the excess generation capacity of the PV array 10. Unlike FIG. 6d, in which no power was transferred to the battery 60, in FIG. 7d the second power converter 50 transfers the excess generation capacity of the PV array 10 to the battery 60 during periods of peak generation. Although not illustrated, the power would subsequently be discharged from the battery 60 back to the DC bus 14 as discussed above during periods of low or no generation by the PV array 10.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An energy storage system for connection to an alternate energy source, wherein the alternate energy source includes a first power converter operatively connected to provide energy from the alternate energy source to a utility grid, the energy storage system comprising:
an energy storage device;
a second power converter having an input and an output, wherein:
the input of the second power converter is operatively connected between an output of the alternate energy source and an input to the first power converter,
the output of the second power converter is operatively connected to the energy storage device; and
the second power converter is operative to manage bidirectional power transfer between the input and the output of the second power converter;
at least one sensor operatively connected to an output of the first power converter and generating a signal corresponding to a level of power output from the first power converter; and
a controller receiving the signal from the at least one sensor, wherein:
the controller is operative to generate a command signal to the second power converter,
the command signal defines a desired magnitude and direction of power flow through the second power converter, and
the command signal is generated as a function of the signal corresponding to the level of power output from the first power converter.

2. The energy storage system of claim 1 wherein:
the controller includes a memory operative to store at least one setpoint, the at least one setpoint includes a first setpoint corresponding to a maximum power output from the first power converter, and
the controller generates the command signal to transfer power from the input to the output of the second power converter when the level of power output from the first power converter is at the first setpoint.

3. The energy storage system of claim 2 wherein:
the at least one setpoint includes a second setpoint less than the first setpoint, and
the controller generates the command signal to transfer power from the output to the input of the second power converter wherein the level of power output from the first power converter is less than the second setpoint.

4. The energy storage system of claim 1 wherein:
the controller includes a memory operative to store a schedule including a plurality of predefined time windows, and
the plurality of predefined time windows includes at least one first time window during which the controller generates the command signal to transfer power from the input to the output of the second power converter a cording to a maximum power point tracking routine and independent of the level of power output from the first power converter.

5. The energy storage system of claim 4 wherein the plurality of predefined time windows includes at least one second time window during which the controller generates the command signal to transfer power from the output to the input of the second power converter according to a desired level of power output from the first power converter.

6. The energy storage system of claim 1 wherein:
the controller includes an input operative to receive a power command signal, and
the controller generates the command signal to transfer power from the output to the input of the second power converter when the power command signal is active.

7. The energy storage system of claim 6 further comprising a second controller, wherein the second controller receives a signal corresponding to power drawn from the utility gird, and the second controller generates the power command signal when the level of power drawn from the utility grid exceeds a predefined level of power.

8. A system to manage utilization of energy generated by an alternate energy source, wherein the alternate energy source includes a first power converter operatively connected to provide energy from the alternate energy source to an AC load; the system comprising:
a second power converter having an input and an output, wherein:
the input of the second power converter is operatively connected between an output of the alternate energy source and an input to the first power converter,
the output of the second power converter is operatively connected to a power bus, wherein the power bus is operatively connected to a secondary electrical system having at least one additional power source and at least one energy storage device, and
the second power converter is operative to manage bidirectional power trans for between the input and the output of the second power converter at least one sensor operatively connected to an output of the first power converter and generating a signal corresponding to a level of power output from the first power converter; and
a controller receiving the signal from the at least one sensor, wherein:

the controller is operative to generate a command signal to the second power converter, the command signal defines a desired magnitude and direction of power flow through the second power converter, and the command signal is generated as a function of the signal corresponding to the level of power output from the first power converter.

9. The system of claim 8 wherein the AC load is a utility grid and wherein the first power converter is operative to execute a maximum power point tracking routine to transfer power from the alternate energy source to the utility grid.

10. The system of claim 9 wherein:
the controller includes a memory operative to store at least one setpoint,
the at least one setpoint includes a first setpoint corresponding to a maximum power output from the first power converter, and
the controller generates the command signal to transfer power from the input to the output of the second power converter when the level of power output from the first power converter is at the first setpoint.

11. The system of claim 10 wherein:
the at least one setpoint includes a second setpoint less than the first setpoint, and
the controller generates the command signal to transfer power from the output to the input of the second power converter when the level of power output from the first power converter is less than the second setpoint.

12. The system of claim 9 wherein:
the controller includes a memory operative to store a schedule including a plurality of predefined time windows, and
the plurality of predefined time windows includes at least one first time window during which the controller generates the command signal to transfer power from the input to the output of the second power converter according to a maximum power point tracking routine and independent of the level of power output from the first power converter.

13. The system of claim 12 wherein the plurality of predefined time windows includes at least one second time window during which the controller generates the command signal to transfer power from the output to the input of the second power converter according to a desired level of power output from the first power converter.

14. The system of claim 9 wherein:
the controller includes an input operative to receive a power command signal, and
the controller generates the command signal to transfer power from the output to the input of the second power converter when the power command signal is active.

15. The energy storage system of claim 14 further comprising a second controller, wherein the second controller receives a signal corresponding to power drawn from the utility gird, and the second controller generates the power command signal when the level of power drawn from the utility grid exceeds a predefined level of power.

16. The energy storage system of claim 8 further comprising at least one sensor operatively connected to an output of the alternate energy source and generating a signal corresponding to a level of power output from the alternate energy source, wherein the controller compares the signal corresponding to the level of power output from the first power converter to the signal corresponding to the level of power output from the alternate energy source.

17. The energy storage system of claim 16, wherein the controller generates the command signal to trans for power from the input to the output of the second power converter when the level of power output from the alternate energy source is greater than the level of power output from the first power converter.

18. The energy storage system of claim 16, wherein the controller generates the command signal to transfer power from the output to the input of the second power converter when the level of power output from the alternate energy source is less than the level of power output from the first power converter.

19. A method for managing utilization of energy generated by an alternate energy source, wherein the alternate energy source includes a first power converter operatively connected to provide energy from the alternate energy source to an AC load, the system comprising the steps of:
measuring a level of power output from the first power converter with at least one sensor operatively connected to the output of the first power converter;
comparing the level of power output from the first power converter to a first threshold with a controller, wherein the first threshold corresponds to a maximum level of power to transfer with the first power converter and wherein the first threshold is less than the maximum power generation capacity of the alternate energy source;
generating a command signal in the controller to transfer power from an input of a second power converter to an output of the second power converter when the level of power output from the first power converter is at the first threshold, wherein the input of the second power converter is operatively connected between an output of the alternate energy source and an input to the first power converter, the output of the second power converter is operatively connected to at least one energy storage device, and the second power converter is operative to manage bidirectional power transfer between the input and the output of the second power converter; and
transmitting the command signal from the controller to the second power converter to transfer power generated by the alternate energy source beyond the first threshold to the energy storage device.

20. The method of claim 19 further comprising the steps of:
generating a command signal in the controller to transfer power from the output of the second power converter to the input of the second power converter when the level of power output from the first power converter is below a second threshold, wherein the second threshold is less than the first threshold; and
transmitting the command signal from the controller to the second power converter to transfer power stored in the energy storage device to the input of the first power converter.

* * * * *